United States Patent
Kaneko et al.

(10) Patent No.: US 8,844,987 B2
(45) Date of Patent: Sep. 30, 2014

(54) CRASH BOX AND BUMPER DEVICE

(71) Applicants: Aisin Seiki Kabushiki Kaisha, Kariya (JP); Aisin Keikinzoku Kabushiki Kaisha, Imizu (JP)

(72) Inventors: Takanobu Kaneko, Kariya (JP); Kiyoichi Kita, Okazaki (JP); Tamaki Obaysahi, Toyama (JP); Kyosuke Matsui, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/794,940

(22) Filed: Mar. 12, 2013

(65) Prior Publication Data

US 2013/0241219 A1 Sep. 19, 2013

(30) Foreign Application Priority Data

Mar. 14, 2012 (JP) ................. 2012-057227

(51) Int. Cl.
*B60R 19/34* (2006.01)
(52) U.S. Cl.
USPC .......................... 293/133; 293/155
(58) Field of Classification Search
CPC ........ B60R 19/02; B60R 19/18; B60R 19/34; B60R 2019/24; B60R 2019/26; B60R 2019/262
USPC .......... 293/133, 155, 203.01, 203, 2, 193.09, 293/187.05, 187.11
See application file for complete search history.

(56) References Cited

U.S. PATENT DOCUMENTS

| 5,803,514 A * | 9/1998 | Shibuya et al. ............... 293/133 |
| 7,399,013 B2 * | 7/2008 | Lutke-Bexten et al. ...... 293/102 |
| 7,793,997 B2 | 9/2010 | Karlander |
| 2010/0194125 A1 | 8/2010 | Wibbeke et al. |
| 2013/0099514 A1 | 4/2013 | Kaneko et al. |

FOREIGN PATENT DOCUMENTS

JP 2009-508760 3/2009

* cited by examiner

*Primary Examiner* — Dennis H Pedder
(74) *Attorney, Agent, or Firm* — Finnegan, Henderson, Farabow, Garrett & Dunner, LLP

(57) ABSTRACT

Provided is a crash box to be installed to a bumper reinforcement including an outer-wall section, an upper-wall section and a lower-wall section, an upper inner-wall section, a lower inner-wall section, and a clearance between the upper inner-wall section and the lower inner-wall section. The crash box includes a body section provided between a member of a vehicle body side and the bumper reinforcement, an upper support section provided to protrude from the body section to a bumper reinforcement side, a lower support section provided to protrude from the body section to the bumper reinforcement side, and an insertion section provided to protrude from the body section to the bumper reinforcement side, inserted from the clearance into the bumper reinforcement and contacting a lower end portion of the upper inner-wall section and an upper end portion of the lower inner-wall section.

4 Claims, 7 Drawing Sheets

CRASH BOX AND BUMPER DEVICE

CROSS REFERENCE TO RELATED APPLICATIONS

This application is based on and claims priority under 35 U.S.C. §119 to Japanese Patent Application 2012-057227, filed on Mar. 14, 2012, the entire content of which is incorporated herein by reference.

TECHNICAL FIELD

This disclosure relates to a crash box which is installed to a bumper reinforcement and a bumper device.

BACKGROUND DISCUSSION

For example, JP 2009-508760T (Reference 1) and US 2010/0194125A (Reference 2) disclose a crash box which is provided between a bumper reinforcement and a side member (a member of a vehicle body side), and installed to the bumper reinforcement. The crash box disclosed in References 1 and 2 includes two plate-shaped support sections which are provided in the front end side thereof and separated from each other in the vertical direction, and the bumper reinforcement is inserted between the two support sections. In addition, the support sections of the crash box and the bumper reinforcement have mounting holes, and the bumper reinforcement is inserted between the support sections of the crash box so that center axes of the mounting holes match with each other. Then, a bolt is inserted into the mounting holes from one of the support sections, front end side of the bolt is outwardly exposed from the other of the support sections and the exposed front end side of the bolt is fastened by a nut. In this way, the crash box is installed to the bumper reinforcement by inserting the bumper reinforcement between the support sections.

If the bumper reinforcement is open forwards or rearwards, in other words, if a cross-section perpendicular to the extending direction of the bumper reinforcement is an open cross-section, when the bolts are fastened to fix the crash box to the bumper reinforcement, the bumper reinforcement and the support sections may be deflected due to a fastening force. Thus, a fastening torque of the bolt cannot be too large and the bumper reinforcement cannot be firmly fixed to the crash box. If the bumper reinforcement is not open forwards and rearwards, in other words, if the cross-section perpendicular to the extending direction of the bumper reinforcement is a closed cross-section, the deflection described above can be prevented, however, the weight of the bumper reinforcement is increased. In addition, in this case, the material cost is high compared to the case where the cross-section perpendicular to the extending direction of the bumper reinforcement is the open cross-section.

A need thus exists for a crash box and a bumper device which is not susceptible to the drawback mentioned above.

SUMMARY

According to an aspect of this disclosure, there is provided a crash box configured to be installed to a bumper reinforcement including an outer-wall section which extends in a width direction of a vehicle at a front or a rear of a vehicle interior, an upper-wall section and a lower-wall section which extend from an upper end portion and a lower end portion of the outer-wall section to the vehicle interior, respectively; an upper inner-wall section which extends to a lower side from an end portion of the upper-wall section in a vehicle interior side; a lower inner-wall section which extends to an upper side from an end portion of the lower-wall section in the vehicle interior side, wherein a clearance is formed between the upper inner-wall section and the lower inner-wall section in a vertical direction. The crash box includes: a body section which is provided between a member of a vehicle body side and the bumper reinforcement; an upper support section which is provided to protrude from the body section to a bumper reinforcement side and comes into contact with an upper surface of the upper-wall section; a lower support section which is provided to protrude from the body section to the bumper reinforcement side and comes into contact with the lower surface of the lower-wall section; and an insertion section which is provided to protrude from the body section to the bumper reinforcement side, is inserted from the clearance into the bumper reinforcement and comes into contact with a lower end portion of the upper inner-wall section and an upper end portion of the lower inner-wall section.

According to another aspect of this disclosure, there is provided a bumper device including a bumper reinforcement, and a crash box installed to the bumper reinforcement. The bumper reinforcement includes: an outer-wall section which extends in a width direction of a vehicle at a front or a rear of a vehicle interior; an upper-wall section and a lower-wall section which extend from an upper end portion and a lower end portion of the outer-wall section to the vehicle interior, respectively; an upper inner-wall section which extends to a lower side from an end portion of the upper-wall section in a vehicle interior side; a lower inner-wall section which extends to an upper side from an end portion of the lower-wall section in the vehicle interior side, wherein a clearance is formed between the upper inner-wall section and the lower inner-wall section in a vertical direction. The crash box includes: a body section which is provided between a member of a vehicle body side and the bumper reinforcement; an upper support section which is provided to protrude from the body section to a bumper reinforcement side and comes into contact with an upper surface of the upper-wall section; a lower support section which is provided to protrude from the body section to the bumper reinforcement side and comes into contact with the lower surface of the lower-wall section; and an insertion section which is provided to protrude from the body section to the bumper reinforcement side, is inserted from the clearance into the bumper reinforcement and comes into contact with a lower end portion of the upper inner-wall section and an upper end portion of the lower inner-wall section.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
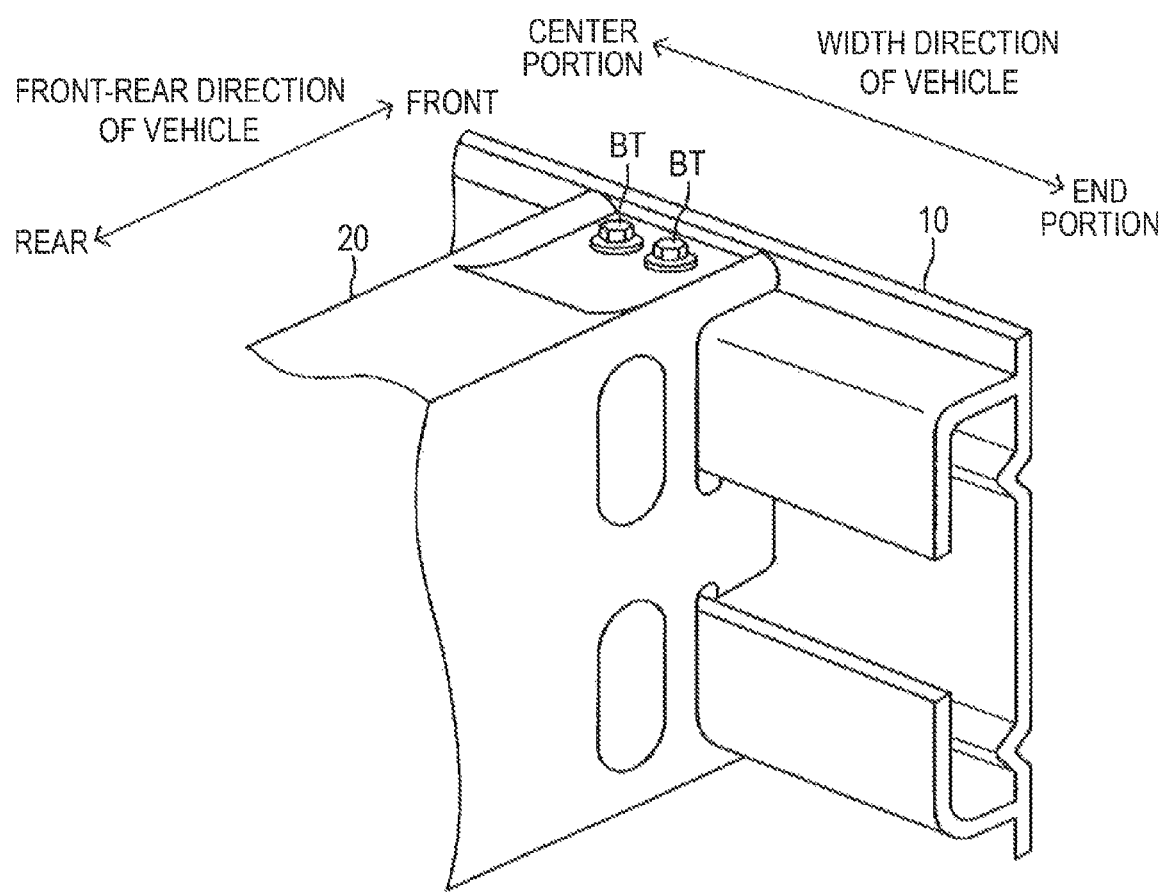
FIG. 1 is a perspective view illustrating a state where a bumper reinforcement is installed with a crash box according to an embodiment disclosed here.
Figure 2:
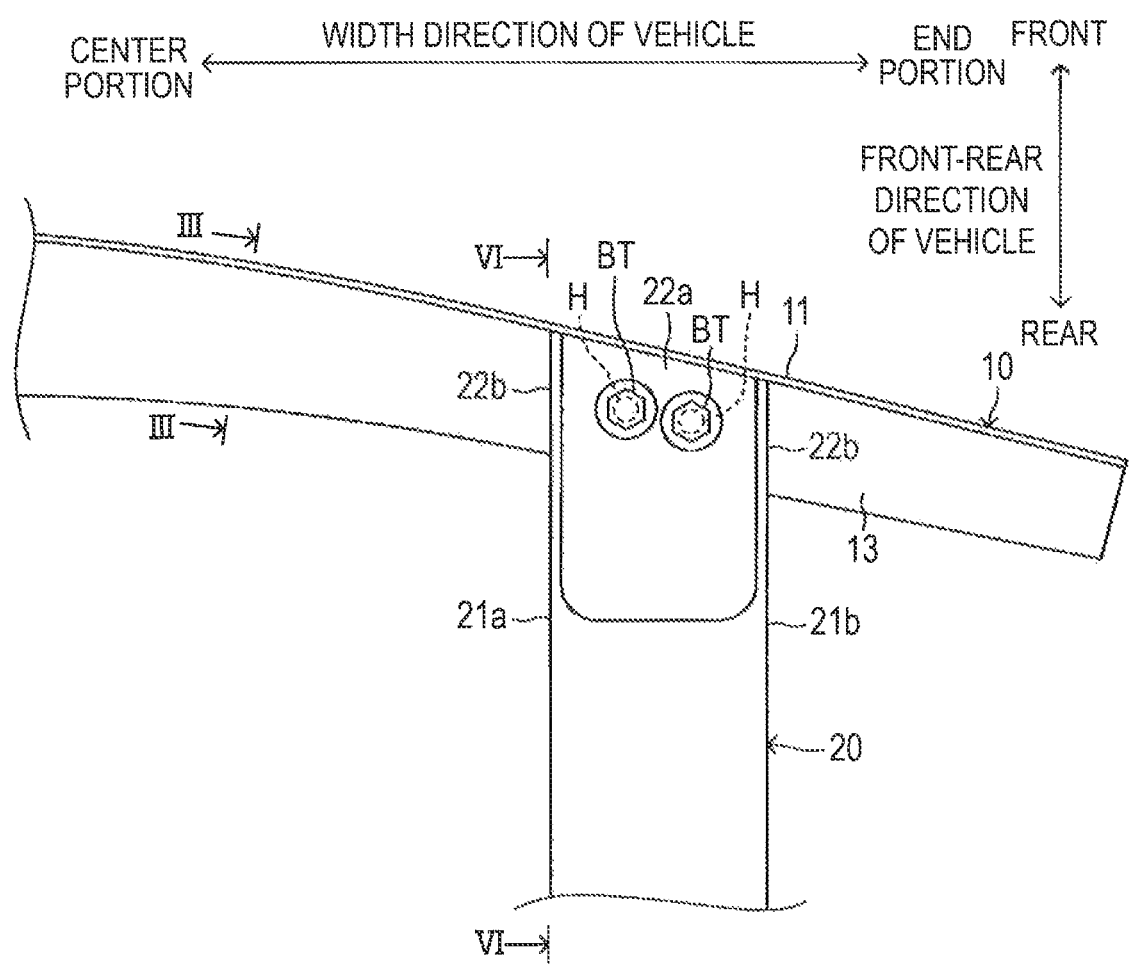
FIG. 2 is a plan view illustrating a state where the bumper reinforcement is installed with the crash box according to the embodiment disclosed here.

A crash box 20 according to an embodiment disclosed here will be explained with reference to the attached drawings. As illustrated in FIGS. 1 and 2, a bumper reinforcement 10 is installed with the front end portion of the crash box 20 in the front-rear direction of a vehicle. In addition, the bumper reinforcement 10 and the crash box 20 are described as members which are provided in the front of a vehicle interior, however, the embodiment disclosed here may be applied to a case where the members are provided in the rear of the vehicle interior. The longitudinal direction of the bumper reinforcement 10 is extended in the width direction of the vehicle. FIGS. 1 and 2 illustrate only a right portion from the center portion of the bumper reinforcement 10 in the longitudinal direction. The description of the left portion from the center portion of the bumper reinforcement 10 in the longitudinal direction is omitted because it is symmetrical with the right portion.

Figure 3:
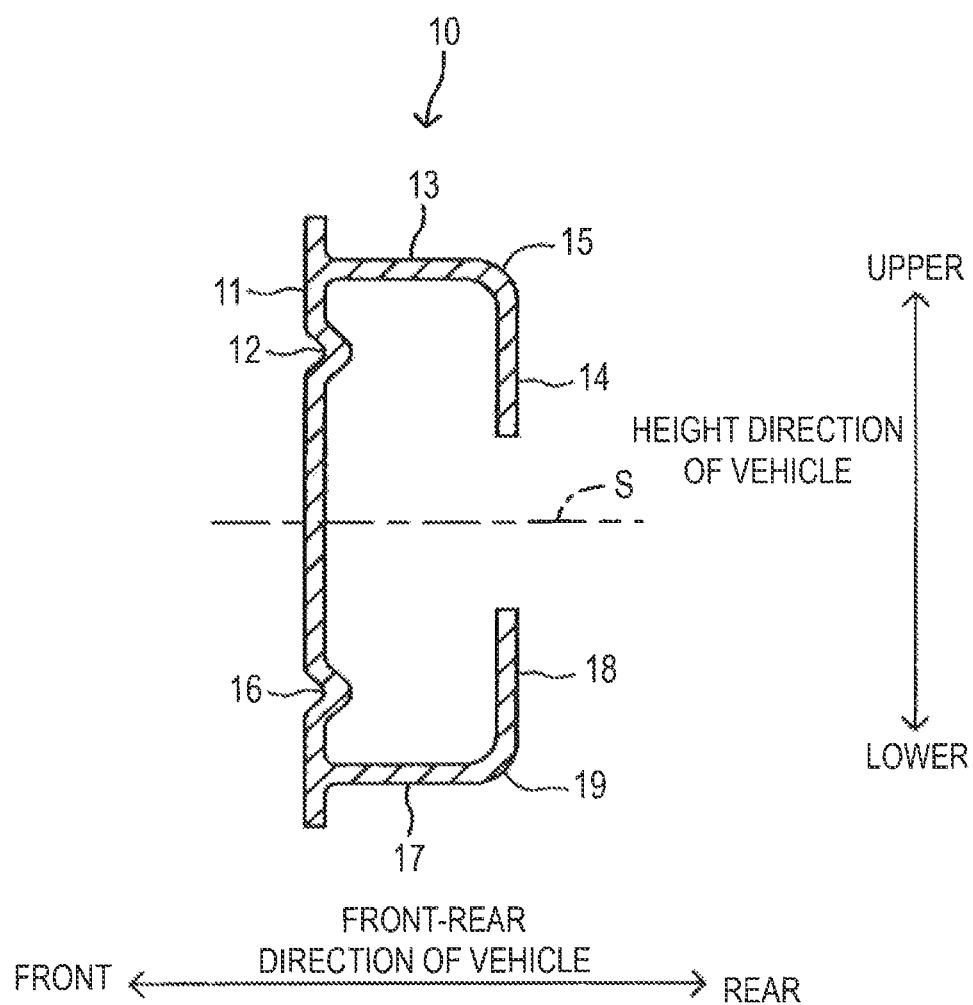
FIG. 3 is a cross-sectional view which is taken along line in FIG. 2.

As illustrated in FIG. 3, the bumper reinforcement 10 includes an outer-wall section 11, an upper groove section 12, an upper-wall section 13, an upper inner-wall section 14, an upper curved-wall section 15, a lower groove section 16, a lower-wall section 17, a lower inner-wall section 18 and a lower curved-wall section 19. The outer-wall section 11 extends in the width direction of the vehicle in the front of the vehicle interior and is formed in a long plate shape of which the longitudinal direction is the width direction of the vehicle. The outer-wall section 11 is curved in the front-rear direction of the vehicle in a plan view (see, FIG. 2). In other words, both end portions in the width direction of the vehicle are positioned slightly on the rearwards from the center portion in the width direction of the vehicle. The length of the outer-wall section 11 in the height direction of the vehicle is constant along the width direction of the vehicle.

The upper groove section 12 extends between a plane S bisecting the outer-wall section 11 in the height direction of the vehicle and the upper end of the outer-wall section 11 in the front of the outer-wall section 11 along the extending direction of the outer-wall section 11. The upper groove section 12 exhibits a V shape in a cross-section perpendicular to the extending direction of the outer-wall section 11.

The upper-wall section 13 is a plate-shaped portion extending from the vicinity of the upper end of the outer-wall section 11 to the rear of the vehicle of the outer-wall section 11, in other words, extending horizontally toward the vehicle interior side. Mounting holes H and H, in which bolts BT and BT for installing the crash box 20 to the bumper reinforcement 10 are inserted, are provided in the upper-wall section 13 to pass through the upper and lower surfaces thereof (see, FIG. 2).

The upper inner-wall section 14 is a plate-shaped portion which is provided in the rear of the upper-wall section 13 along the width direction of the vehicle. The upper inner-wall section 14 is curved in the front-rear direction of the vehicle in a plan view. In other words, both end portions in the width direction of the vehicle are positioned in slightly rearwards from the center portion in the width direction of the vehicle.

The upper curved-wall section 15 is formed so as to make the rear end of the upper-wall section 13 of the vehicle and the upper end of the upper inner-wall section 14 to be curvilinearly connected, and is extended in the width direction of the vehicle. Accordingly, the upper inner-wall section 14 is extended to a lower side from the end portion of the rear end side of the vehicle (the vehicle interior side) of the upper-wall section 13 via the upper curved-wall section 15.

The bumper reinforcement 10 is formed vertically symmetrical with respect to the plane S. Specifically, the lower groove section 16, the lower-wall section 17, the lower inner-wall section 18 and the lower curved-wall section 19 are symmetrical with the upper groove section 12, the upper-wall section 13, the upper inner-wall section 14 and the upper curved-wall section 15, respectively. Accordingly, the lower-wall section 17 extends from the lower end portion of the outer-wall section 11 to the rear (the vehicle interior side) of the vehicle and the lower inner-wall section 18 extends to an upper side from the end portion of the rear end (the vehicle interior side) of the vehicle of the lower-wall section 17 via the lower curved-wall section 19. In addition, the positions of the rear surface of the upper inner-wall section 14 and the rear surface of the lower inner-wall section 18 are the same as each other in the front-rear direction. In addition, the lower end of the upper inner-wall section 14 and the upper end of the lower inner-wall section 18 are separated in the vertical direction. In other words, a clearance is formed between the lower end of the upper inner-wall section 14 and the upper end of the lower inner-wall section 18 along the extending direction thereof. That is, the bumper reinforcement 10 is open on the rear side (the crash box 20 side) and the cross-section perpendicular to the longitudinal direction thereof is the open cross-section.

Figure 4:
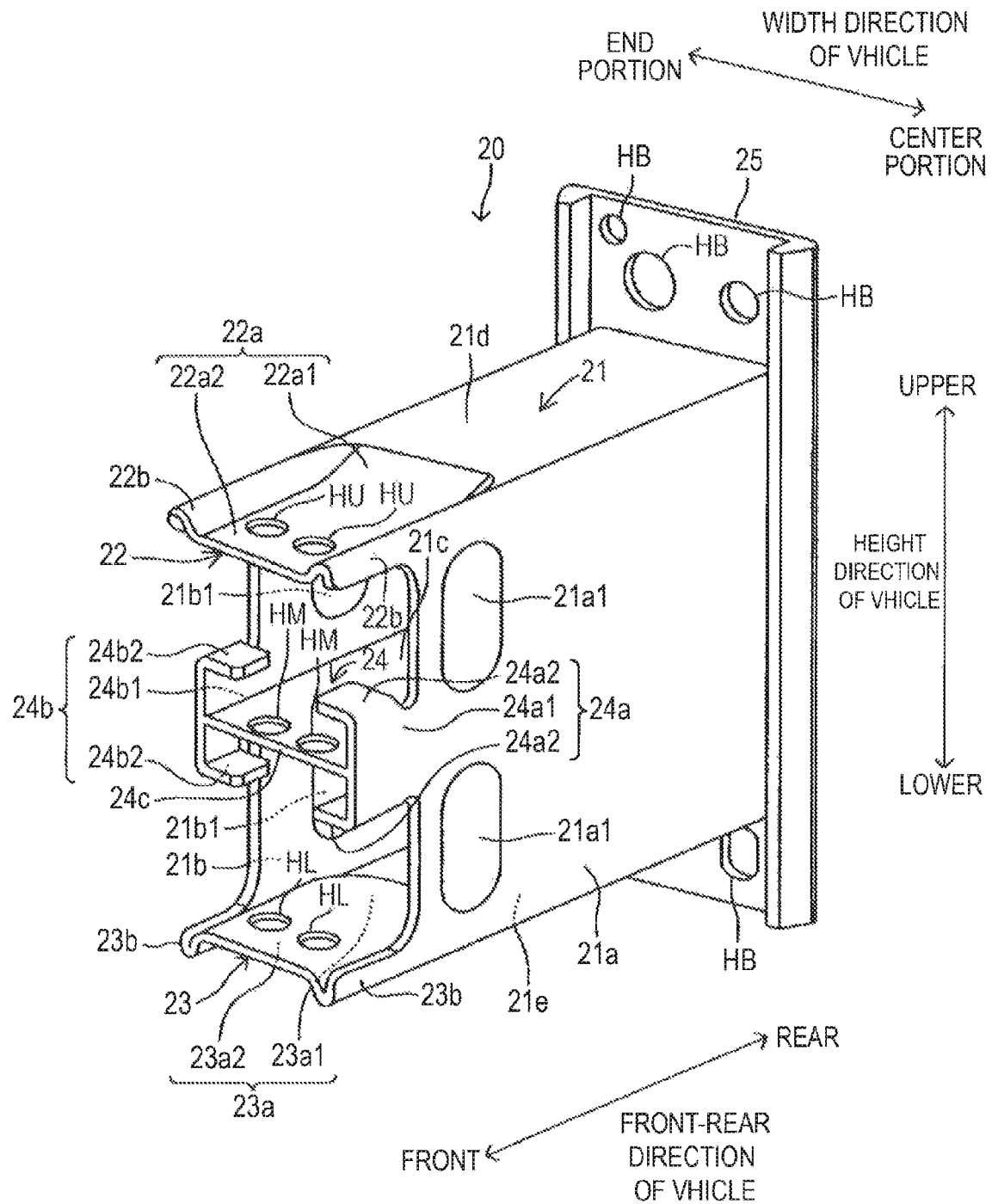
FIG. 4 is a perspective view of the crash box of FIGS. 1 and 2.
Figure 5:
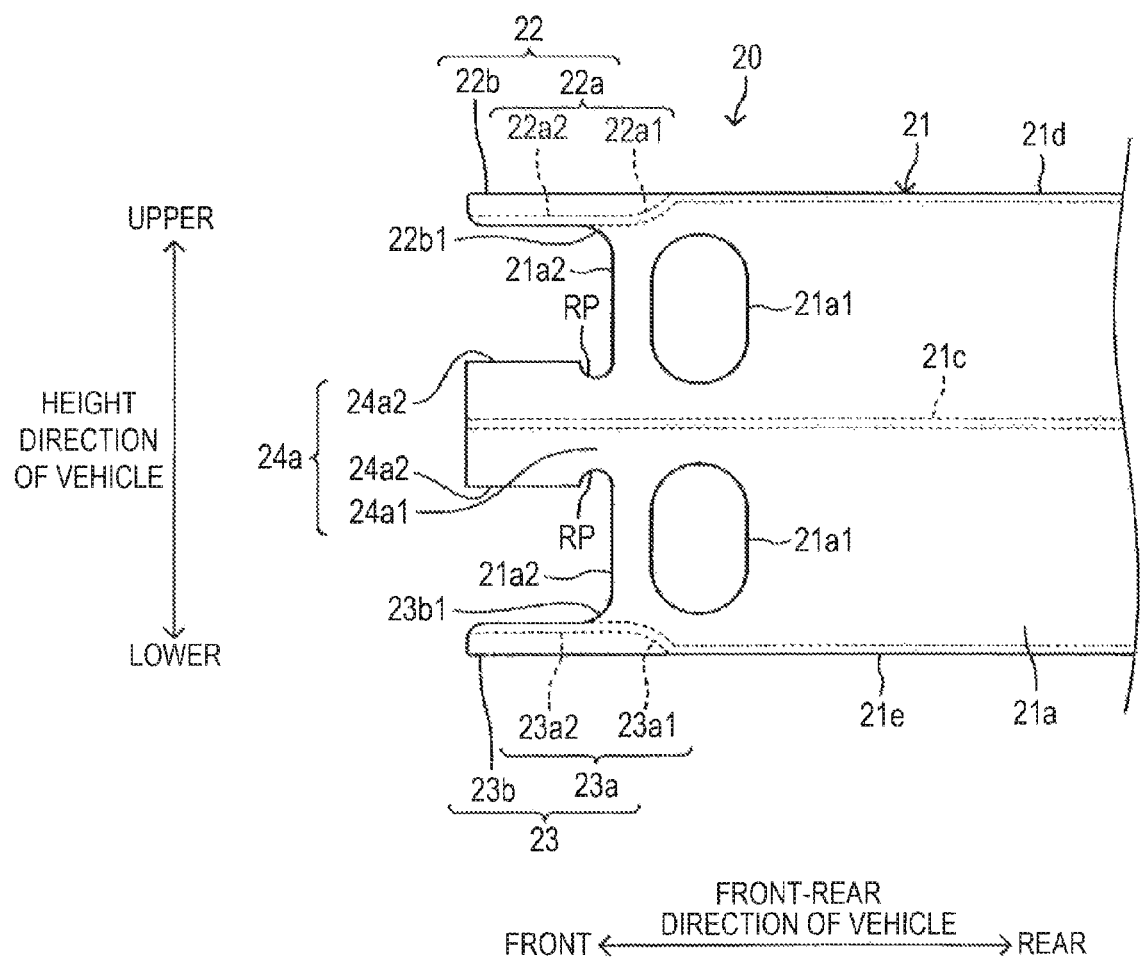
FIG. 5 is a side view of the crash box of FIGS. 1 and 2.

Next, the crash box 20 installed to the bumper reinforcement 10 will be described. As illustrated in FIGS. 4 and 5, the crash box 20 has a body section 21, an upper support section 22, a lower support section 23, an insertion section 24 and a rear connection section 25. The body section 21 is provided between a member (for example, a side member or the like configuring the vehicle body) of the vehicle side and the bumper reinforcement 10. The body section 21 is formed having an angular cylinder shape extending in the front-rear direction of the vehicle. Concave sections 21a1 and 21a1 having a long circle shape, of which the longitudinal direction is the height direction of the vehicle, are arranged in parallel in the height direction of the vehicle on a side wall section 21a that is the side wall section of the body section 21 and is a side wall positioned in the center portion of the bumper reinforcement 10. In addition, concave sections 21b1 and 21b1 having the same shapes as the concave sections 21a1 and 21a1 are also provided on a side wall section 21b that is a side wall section of the body section 21 and a side wall positioned in the end portion of the bumper reinforcement 10. When a load is applied in the front-rear direction, the crash box 20 is buckled at the concave sections 21a1 and 21a1, and the concave sections 21b1 and 21b1. In addition, the center portions of the side wall section 21a and the side wall section 21b in the height direction of the vehicle are connected to each other by a rib 21c.

The upper support section 22 extends toward the front side of the vehicle so as to protrude from the front end portion and the upper end portion of the body section 21 to the bumper reinforcement 10 side. Specifically, the upper support section 22 extends from the front end portion of an upper-wall section 21d of the body section 21, the front end portion and upper end portion of the side wall section 21a, and the front end portion and the upper end portion of the side wall section 21b to the front side of the vehicle. The upper surface of a middle section 22a of the upper support section 22 in the width direction of the vehicle is formed so as to be positioned lower than the upper end of end sections 22b and 22b of the upper support section 22 in the width direction of the vehicle and the upper surface of the upper-wall section 21d of the body section 21. In other words, the middle section 22a is configured of an inclined section 22a1 which is inclined to be lowered gradually according to going to the front side from the front end portion of the upper-wall section 21*d* and a horizontal section 22*a*2 which is extended horizontally to the front side from the front end portion of the inclined section 22*a*1. Mounting holes HU and HU, in which the bolts BT for fastening the crash box 20 to the bumper reinforcement 10 are inserted, are provided in the horizontal section 22*a*2. In addition, the front end of the end sections 22*b* of the side wall section 21*a* side of the end sections 22*b* and 22*b* of the upper support section 22 in the width direction of the vehicle is positioned in rear side from the end sections 22*b* of the side wall section 21*b* side. Accordingly, the front end of the horizontal section 22*a*2 is inclined so as to be positioned in the rear according to going from the side wall section 21*a* side to the side wall section 21*b* side in a plan view (see, FIG. 2). As described above, the length of the upper support section 22 in the front-rear direction is adjusted so as to accord with the width from the rear end of the outer-wall section 11 of the bumper reinforcement 10 to the rear end of the upper inner-wall section 14 in the front-rear direction. In addition, the lower surface of the rear end portion of the end sections 22*b* of the upper support section 22 is formed in a circular shape in a side view. When the crash box 20 is installed to the bumper reinforcement 10, a rear-end lower surface 22*b*1 of the end sections 22*b* is configured to extend along the upper surface of the upper curved-wall section 15 (see, FIG. 5).

The lower support section 23 is formed symmetrical with the upper support section 22 around the rib 21*c*. In other words, the lower support section 23 is formed so as to extend from the front end portion of a lower-wall section 21*e* of the body section 21, the front end portion and the lower end portion of the side wall section 21*a*, and the front end portion and the lower end portion of the side wall section 21*b* to the front of the vehicle, and to protrude from the lower end portion of the body section 21 to the bumper reinforcement 10 side. The lower surface of a middle section 23*a* of the lower support section 23 in the width direction of the vehicle is formed so as to be positioned at an upper side from end sections 23*b* of the lower support section 23 in the width direction of the vehicle and the lower surface of the lower-wall section 21*e*. In other words, the middle section 23*a* is formed of an inclined section 23*a*1 which is inclined so as to gradually rise according to going to the front side from the front end portion of the lower-wall section 21*e* and a horizontal section 23*a*2 which is extended horizontally to the front side from the front end of the inclined section 23*a*1. Mounting holes HL and HL, in which the bolts BT are inserted, are provided in the horizontal section 23*a*2. In addition, the front end of the end sections 23*b* of the side wall section 21*b* side of the end sections 23*b* and 23*b* of the lower support section 23 in the width direction of the vehicle is positioned rear side from the end sections 23*b* of the side wall section 21*a* side. Accordingly, the front end of the horizontal section 23*a*2 is inclined so as to be positioned in the rear side according to going from the side wall section 21*a* side to the side wall section 21*b* side in a plan view. In addition, the upper surface of the rear end portion of the end sections 23*b* of the lower support section 23 is formed in a circular shape in a side view. When the crash box 20 is installed to the bumper reinforcement 10, a rear-end upper surface 23*b*1 of the end sections 23*b* is configured to extend along the lower surface of the lower curved-wall section 19.

Figure 7:
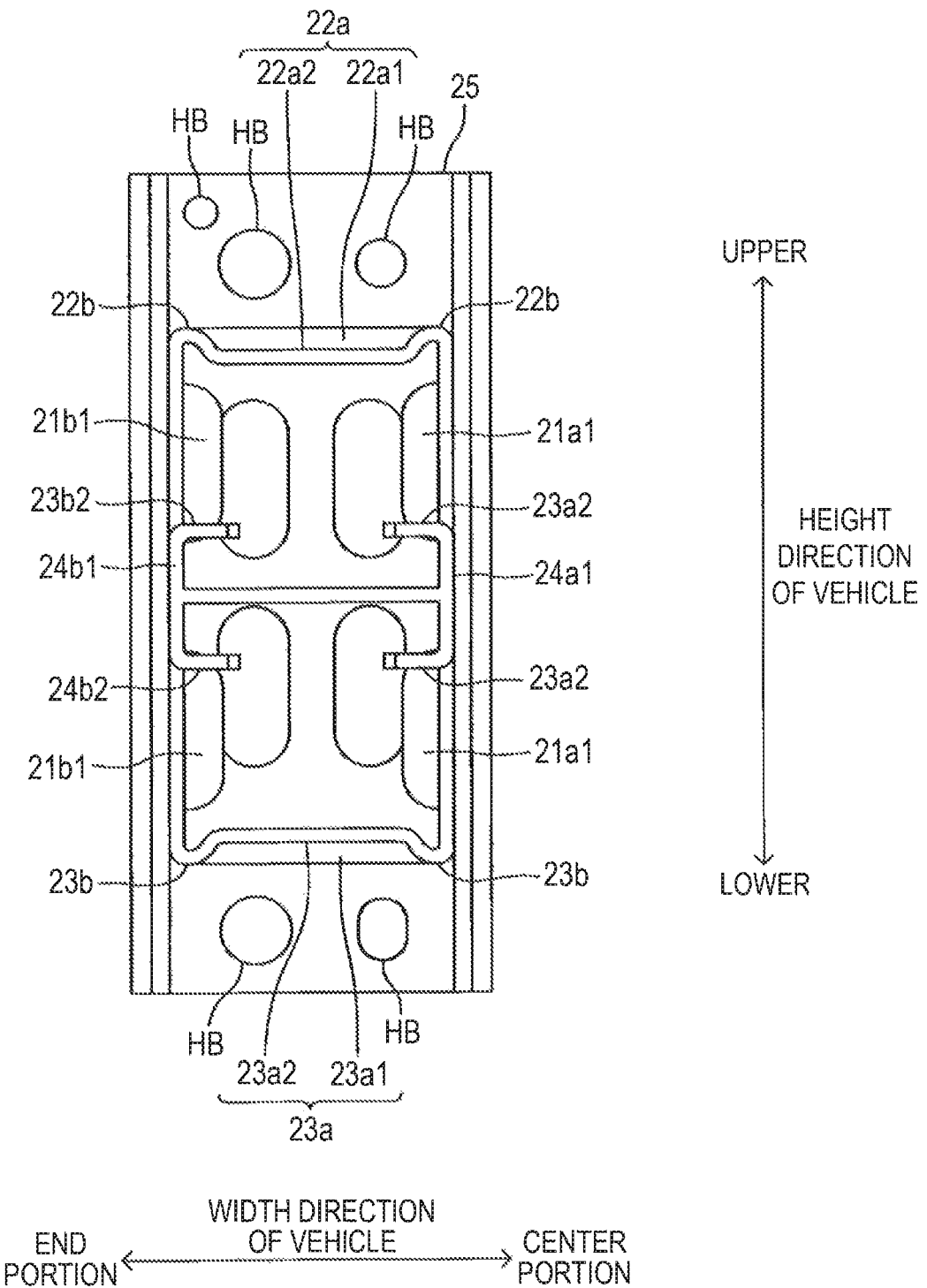
FIG. 7 is a front view of the crash box of FIGS. 1 and 2.

The insertion section 24 extends to the front of the vehicle so as to protrude from the body section 21 to the bumper reinforcement 10 side. The insertion section 24 is positioned at the center of the body section 21 in the height direction of the vehicle. The insertion section 24 is formed of a first insertion section 24*a* which protrudes from the side wall section 21*a* to the bumper reinforcement 10 side (the front side of the vehicle), a second insertion section 24*b* which protrudes from the side wall section 21*b* to the bumper reinforcement 10 side (the front side of the vehicle) and a rib 24*c* which makes the first insertion section 24*a* and the second insertion section 24*b* connected. The first insertion section 24*a* includes a vertical wall section 24*a*1 and a lateral wall section 24*a*2. The vertical wall section 24*a*1 is provided so as to protrude from the center portion of the front end surface of the side wall section 21*a* in the height direction of the vehicle to the bumper reinforcement 10 side (the front side of the vehicle) and is configured to extend in the height direction of the vehicle viewed from the front or the rear of the vehicle as illustrated in FIG. 7. In other words, the vertical wall section 24*a*1 is configured so as to have a plane extending in the front-rear direction and the height direction of the vehicle. In addition, concave sections RP, which are cut out in a circular shape, are formed in the upper and lower sides of the vertical wall section 24*a*1 in the rear end side of the vehicle. The width of the vertical wall section 24*a*1 in the height direction of the vehicle is slightly smaller than the distance between the lower end of the upper inner-wall section 14 and the upper end of the lower inner-wall section 18 of the bumper reinforcement 10. The length of the vertical wall section 24*a*1 in the front-rear direction of the vehicle is substantially the same as that of the vertical wall section 24*a*1 in the height direction of the vehicle. The positions of the front end of the vertical wall section 24*a*1, the front end of the end section 22*b* of the side wall section 21*a* side in the upper support section 22, and the end section 23*b* of the side wall section 21*a* side in the lower support section 23 are the same as one another in the front-rear direction of the vehicle. The lateral wall sections 24*a*2 are formed from the upper end and the lower end of the vertical wall section 24*a*1. As illustrated in FIG. 7, the lateral wall section 24*a*2 is configured so as to extend in the width direction of the vehicle viewed from the front or the rear of the vehicle. In other words, the lateral wall section 24*a*2 is configured so as to have a plane extending in the front-rear direction of the vehicle and the width direction of the vehicle.

The second insertion section 24*b* is positioned rearwards from the first insertion section 24*a*. The second insertion section 24*b* includes a vertical wall section 24*b*1 and a lateral wall section 24*b*2. The vertical wall section 24*b*1 is configured similar to the vertical wall section 24*a*1. The positions of the front end of the vertical wall section 24*b*1, the front end of the end section 22*b* of the side wall section 21*b* side in the upper support section 22 and the end section 23*b* of the side wall section 21*b* side of the lower support section 23 are the same as one another in the front-rear direction of the vehicle. In addition, the lateral wall section 24*b*2 is configured similar to the lateral wall section 24*a*2.

The rib 24*c* is a plate-shaped portion which is extended from the front end of the rib 21*c* to the front ends of the insertion section 24*a* and the insertion section 24*b*. Mounting holes HM and HM in which bolts BT are inserted are provided in the front end side of the rib 24*c*.

The rear connection section 25 is a plate-shaped portion which is joined to the rear end of the body section 21 and of which the longitudinal direction is the height direction of the vehicle, and of which the lateral direction is the width direction of the vehicle. The length of the rear connection section 25 in the height direction of the vehicle is greater than the length of the body section 21 in the height direction of the vehicle. The upper end of the rear connection section 25 is positioned at an upper side from the upper end of the body section 21 and the lower end of the rear connection section 25 is positioned at a lower side from the lower end of the body section 21. The length of the rear connection section 25 in the width direction of the vehicle is slightly greater than the length of the body section 21 in the width direction of the vehicle. Both end portions of the rear connection section 25 in the width direction of the vehicle protrude towards front side along the height direction of the vehicle. Mounting holes HB in which bolts (not illustrated) for installing the crash box 20 to the vehicle body (for example, the side member) are inserted are provided in the rear connection section 25.

Figure 6:
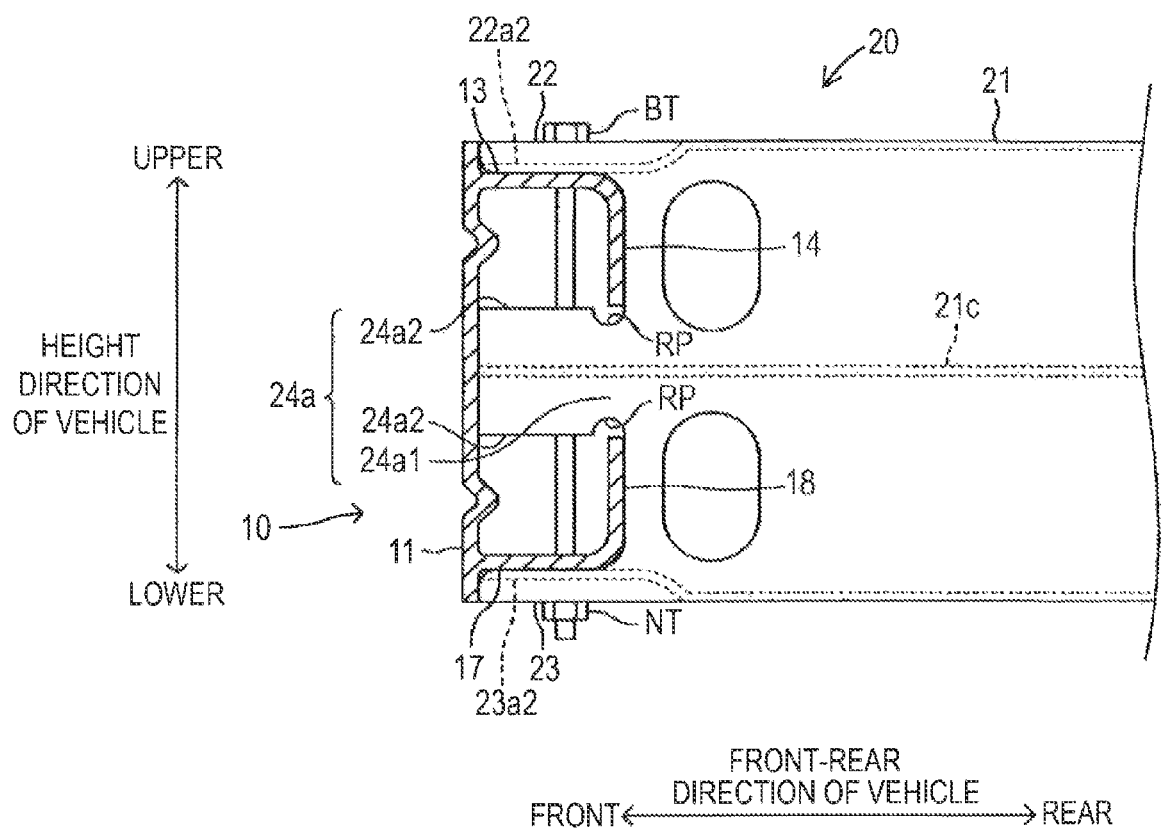
FIG. 6 is a cross-sectional view which is taken along line VI-VI in FIG. 2.

Next, the procedure for installing the crash box 20 to the bumper reinforcement 10 will be described. As illustrated in FIG. 6, first, the upper-wall section 13 and the lower-wall section 17 of the bumper reinforcement 10 are inserted between the upper support section 22 and the lower support section 23 of the crash box 20 thereby inserting the bumper reinforcement 10 in the front end portion of the crash box 20. At this time, the insertion section 24 of the crash box 20 is inserted from the clearance provided between the upper inner-wall section 14 and the lower inner-wall section 18 of the bumper reinforcement 10 into the bumper reinforcement 10. At this time, the front end surface of the insertion section 24 comes into contact with the rear surface of the outer-wall section 11. At the same time, rear surfaces of the upper inner-wall section 14 and the lower inner-wall section 18 come into contact with the front end surface of the body section 21 (the side wall sections 21$a$ and 21$b$). In this state, the center axis of the mounting hole H provided in the bumper reinforcement 10 accords with the center axes of the mounting hole HU, the mounting hole HM and the mounting hole HL provided in the crash box 20. Next, from the upper-wall section 13, the bolt BT is inserted in the mounting hole HU, the mounting hole H, the mounting hole HM, the mounting hole H and the mounting hole HL, and the front end of the bolt BT is exposed from the lower-wall section 17, and then is fastened by the nut NT. Accordingly, the lower surface of the horizontal section 22$a$2 comes into contact with the upper surface of the upper-wall section 13 and at the same time, the upper surface of the horizontal section 23$a$2 comes into contact with the lower surface of the lower-wall section 17. The upper-wall section 13 and the lower-wall section 17 are supported on the upper support section 22 and the lower support section 23, respectively.

Then, when the fastening torque of the bolt BT and the nut NT is further increased, the upper-wall section 13 and the lower-wall section 17 are inserted in the upper support section 22 and the lower support section 23, the upper-wall section 13 and the lower-wall section 17 are slightly deflected, the lower end of the upper inner-wall section 14 and the upper end of the lower inner-wall section 18 are accommodated in the concave sections RP respectively, and then come into contact with the upper end and the lower end of the vertical wall sections 24$a$1 and 24$b$1 inside the concave sections RP. In this state, the upper inner-wall section 14, the insertion section 24 and the lower inner-wall section 18 are integrated and function as a reinforcing rib of the upper-wall section 13 and the lower-wall section 17. Accordingly, even though the fastening torque of the bolt BT is increased, large deflection of the upper-wall section 13 and the lower-wall section 17 is prevented. Thus, the crash box 20 can be firmly fixed to the bumper reinforcement 10. In addition, the upper inner-wall section 14 and the lower inner-wall section 18 are slightly inclined in the height direction of the vehicle by deflecting slightly the upper-wall section 13 and the lower-wall section 17 when fastening the bolt BT. As described above, even though the upper inner-wall section 14 and the lower inner-wall section 18 are inclined, the lower end of the upper inner-wall section 14 and the upper end of the lower inner-wall section 18 are accommodated in the concave sections RP so that the lower end of the upper inner-wall section 14 and the upper end of the lower inner-wall section 18 are prevented from sliding in the front of the vehicle at the upper surface and the lower surface of the insertion section 24. Accordingly, since the upper inner-wall section 14, the insertion section 24 and the lower inner-wall section 18 reliably function as the rib of the upper-wall section 13 and the lower-wall section 17, the crash box 20 can be firmly fixed to the bumper reinforcement 10 which is open on the rear side (the crash box 20 side). In addition, the cross-section perpendicular to the bumper reinforcement 10 in the extending direction is the open cross-section. Accordingly, the weight of the bumper reinforcement 10 can be reduced compared to the weight of the bumper reinforcement having a closed cross-section. In addition, the material cost of the bumper reinforcement 10 can be reduced compared to the bumper reinforcement having the closed cross-section.

In addition, since the front end surface of the insertion section 24 comes into contact with the rear surface of the outer-wall section 11, the insertion section 24 functions as the rib of the outer-wall section 11. In particular, in the embodiment, in addition to the vertical wall sections 24$a$1 and 24$b$1, the front end surfaces of lateral wall sections 24$a$3 and 24$b$3 come into contact with the rear surface of the outer-wall section 11 and increases a contact area between the front end surface of the insertion section 24 and the rear surface of the outer-wall section 11. Thus, the outer-wall section 11 is further reinforced with the insertion section 24. Accordingly, the strength of the bumper reinforcement 10 can be further improved.

Furthermore, the embodiment disclosed here is not limited to the embodiment described above and various modifications may be made without deviating from the object of the embodiment disclosed here.

In the embodiment described above, the front end surface of the insertion section 24 comes into contact with the rear surface of the outer-wall section 11, in a state where the crash box 20 is installed to the bumper reinforcement 10. However, a space may be provided between the front end surface of the insertion section 24 and the rear surface of the outer-wall section 11, in a state where the crash box 20 is installed to the bumper reinforcement 10. In this case, for example, the deformation of the bumper reinforcement 10 starts in an offset collision, the insertion section 24 does not function as the rib of the outer-wall section 11, however, the bumper reinforcement 10 is deformed slightly. Accordingly, when the rear surface of the outer-wall section 11 comes into contact with the front end surface of the insertion section 24, thereafter, the insertion section 24 functions as the rib of the outer-wall section 11. Thus, even though a space is provided between the front end surface of the insertion section 24 and the rear surface of the outer-wall section 11, the strength of the bumper reinforcement 10 can be improved after the rear surface of the outer-wall section 11 comes into contact with the front end surface of the insertion section 24.

Aspects of this disclosure are further described below.

According to an aspect of this disclosure, there is provided a crash box configured to be installed to a bumper reinforcement including an outer-wall section which extends in a width direction of a vehicle at a front or a rear of a vehicle interior, an upper-wall section and a lower-wall section which extend from an upper end portion and a lower end portion of the outer-wall section to the vehicle interior, respectively; an upper inner-wall section which extends to a lower side from an end portion of the upper-wall section in a vehicle interior side; and a lower inner-wall section which extends to an upper side from an end portion of the lower-wall section in the vehicle interior side, wherein a clearance is formed between the upper inner-wall section and the lower inner-wall section in a vertical direction. The crash box includes: a body section which is provided between a member of a vehicle body side and the bumper reinforcement; an upper support section which is provided to protrude from the body section to a bumper reinforcement side and comes into contact with an upper surface of the upper-wall section; a lower support section which is provided to protrude from the body section to the bumper reinforcement side and comes into contact with the lower surface of the lower-wall section; and an insertion section which is provided to protrude from the body section to the bumper reinforcement side, is inserted from the clearance into the bumper reinforcement and comes into contact with a lower end portion of the upper inner-wall section and an upper end portion of the lower inner-wall section.

In addition, according to another aspect of this disclosure, there is provided a bumper device including a bumper reinforcement, and a crash box installed to the bumper reinforcement. The bumper reinforcement includes: an outer-wall section which extends in a width direction of a vehicle at a front or a rear of a vehicle interior; an upper-wall section and a lower-wall section which extend from an upper end portion and a lower end portion of the outer-wall section to the vehicle interior, respectively; an upper inner-wall section which extends to a lower side from an end portion of the upper-wall section in a vehicle interior side; and a lower inner-wall section which extends to an upper side from an end portion of the lower-wall section in the vehicle interior side, wherein a clearance is formed between the upper inner-wall section and the lower inner-wall section in a vertical direction. The crash box includes: a body section which is provided between a member of a vehicle body side and the bumper reinforcement; an upper support section which is provided to protrude from the body section to a bumper reinforcement side and comes into contact with an upper surface of the upper-wall section; a lower support section which is provided to protrude from the body section to the bumper reinforcement side and comes into contact with the lower surface of the lower-wall section; and an insertion section which is provided to protrude from the body section to the bumper reinforcement side, is inserted from the clearance into the bumper reinforcement and comes into contact with a lower end portion of the upper inner-wall section and an upper end portion of the lower inner-wall section.

In the crash box and bumper device configured as described above, the upper support section and the lower support section of the bumper reinforcement are inserted between the upper support section and the lower support section of the crash box, and in this state, the bumper reinforcement and the crash box are fastened with a fastening member. At this time, the lower end of the upper inner-wall section and the upper end of the lower inner-wall section of the bumper reinforcement comes into contact with the upper surface and the lower surface of the insertion section of the crash box, respectively. The upper inner-wall section, the insertion section and the lower inner-wall section are integrated with such a contact and thereby functioning as a reinforcing rib of the upper-wall section and the lower-wall section of the bumper reinforcement. Accordingly, deflection of the upper-wall section and the lower-wall section of the bumper reinforcement can be prevented. Thus, since a fastening torque of the fastening member can be increased, the bumper reinforcement can be firmly fixed to the crash box. In addition, an opening (the clearance) is formed in the bumper reinforcement applied to the crash box of this disclosure in the vehicle interior side. In other words, the cross-section which is perpendicular to the extending direction of the bumper reinforcement is an open cross-section. Accordingly, the weight of the bumper reinforcement, which is applied to the crash box of this disclosure, can be reduced compared to the weight of the bumper reinforcement having a closed cross-section. In addition, the material cost of the bumper reinforcement can be reduced compared to the bumper reinforcement having the closed cross-section.

In the above crash box and bumper device, an upper surface of the insertion section may have an upper concave section which is capable of receiving the lower end portion of the upper inner-wall section, and a lower surface of the insertion section may have a lower concave section which is capable of receiving the upper end portion of the lower inner-wall section. According to the configuration, when the bumper reinforcement and the crash box are fastened, the lower end portion of the upper inner-wall section and the upper end portion of the lower inner-wall section are received in the upper concave section and the lower concave section, respectively so that motion of the upper inner-wall section and the lower inner-wall section is restricted in the front-rear direction of the vehicle. Accordingly, the lower end of the upper inner-wall section and the upper end of the lower inner-wall section can be prevented from sliding in the upper surface and the lower surface of the insertion section in the front-rear direction of the vehicle. As a result of preventing such a sliding, since the upper inner-wall section, the insertion section and the lower inner-wall section firmly function as the reinforcing rib of the upper-wall section and the lower-wall section, the crash box can be firmly fixed to the bumper reinforcement which is open in the vehicle interior side.

Further, in the above crash box and bumper device, the insertion section may be configured to come into contact with the outer-wall section when a load is applied in the front-rear direction of the vehicle. In a state where the crash box is installed to the bumper reinforcement, when the front end surface of the insertion section of the crash box comes into contact with the outer-wall section of the bumper reinforcement, the insertion section functions as a rib of the outer-wall section. In addition, in a state where the bumper reinforcement is installed to the crash box, even though a space is provided between the front end surface of the insertion section of the crash box and the outer-wall section of the bumper reinforcement, for example, when an offset collision occurs, the bumper reinforcement is deformed slightly. Accordingly, when the outer-wall section comes into contact with the front end surface of the insertion section, thereafter, the insertion section functions as the rib of the outer-wall section. Thus, the strength of the bumper reinforcement can be improved.

Further, in the above crash box and bumper device, the insertion section may be provided to protrude from the body section to the bumper reinforcement side, and have a vertical wall section which extends in a height direction of the vehicle viewed from the front or the rear of the vehicle and a lateral wall section which extends in a width direction of the vehicle viewed from the front or the rear of the vehicle. According to the configuration, an area which comes into contact with the outer-wall section is increased compared to a case that the insertion section is configured of any one of the vertical wall sections and the lateral wall sections. Accordingly, the reinforcing function of the outer-wall section is improved and the strength of the bumper reinforcement can be further improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A crash box configured to be installed to a bumper reinforcement including an outer-wall section which extends in a width direction of a vehicle at a front or a rear of a vehicle interior, an upper-wall section and a lower-wall section which extend from an upper end portion and a lower end portion of the outer-wall section to the vehicle interior, respectively, an upper inner-wall section which extends to a lower side from an end portion of the upper-wall section in a vehicle interior side, and a lower inner-wall section which extends to an upper side from an end portion of the lower-wall section in the vehicle interior side, wherein a clearance is formed between the upper inner-wall section and the lower inner-wall section in a vertical direction, the crash box comprising:
 a body section which is adapted to be provided between a member of a vehicle body side and the bumper reinforcement;
 an upper support section which is provided to protrude from the body section to a bumper reinforcement side and adapted to come into contact with an upper surface of the upper-wall section;
 a lower support section which is provided to protrude from the body section to the bumper reinforcement side and adapted to come into contact with the lower surface of the lower-wall section; and
 an insertion section which is provided to protrude from the body section to the bumper reinforcement side, is adapted to be inserted from the clearance into the bumper reinforcement,
 wherein the body section adapted to come into contact with a lower end portion of the upper inner-wall section and an upper end portion of the lower inner-wall section,
 wherein an upper surface of the insertion section has an upper concave section which is capable of receiving the lower end portion of the upper inner-wall section, and
 wherein a lower surface of the insertion section has a lower concave section which is capable of receiving the upper end portion of the lower inner-wall section.

2. The crash box according to claim 1,
 wherein the insertion section is configured such that the insertion section and the outer-wall section contact one another when a load is applied in a front-rear direction of the vehicle.

3. The crash box according to claim 1,
 wherein the insertion section is provided to protrude from the body section to the bumper reinforcement side, and has a vertical wall section which extends in a height direction of the vehicle viewed from the front or the rear of the vehicle and a lateral wall section which extends in a width direction of the vehicle viewed from the front or the rear of the vehicle.

4. A bumper device comprising:
 a bumper reinforcement; and
 a crash box installed to the bumper reinforcement,
 wherein the bumper reinforcement comprises:
  an outer-wall section which extends in a width direction of a vehicle at a front or a rear of a vehicle interior;
  an upper-wall section and a lower-wall section which extend from an upper end portion and a lower end portion of the outer-wall section to the vehicle interior, respectively;
  an upper inner-wall section which extends to a lower side from an end portion of the upper-wall section in a vehicle interior side; and
  a lower inner-wall section which extends to an upper side from an end portion of the lower-wall section in the vehicle interior side,
 wherein a clearance is formed between the upper inner-wall section and the lower inner-wall section in a vertical direction,
 wherein the crash box comprises:
  a body section which is provided between a member of a vehicle body side and the bumper reinforcement;
  an upper support section which is provided to protrude from the body section to a bumper reinforcement side and comes into contact with an upper surface of the upper-wall section;
  a lower support section which is provided to protrude from the body section to the bumper reinforcement side and comes into contact with the lower surface of the lower-wall section; and
  an insertion section which is provided to protrude from the body section to the bumper reinforcement side, is inserted from the clearance into the bumper reinforcement,
 wherein the body section comes into contact with a lower end portion of the upper inner-wall section and an upper end portion of the lower inner-wall section,
 wherein an upper surface of the insertion section has an upper concave section which is capable of receiving the lower end portion of the upper inner-wall section, and
 wherein a lower surface of the insertion section has a lower concave section which is capable of receiving the upper end portion of the lower inner-wall section.

* * * * *